Oct. 10, 1933.　　　O. LALONDE　　　1,930,172
AUTOMATIC FRICTION CLUTCH
Filed May 6, 1932　　　2 Sheets-Sheet 1

INVENTOR-
O. LALONDE
BY-
Louis H. Carreau
ATTORNEY.

Patented Oct. 10, 1933

1,930,172

UNITED STATES PATENT OFFICE 1,930,172

AUTOMATIC FRICTION CLUTCH

Ovila Lalonde, Wrightville, Quebec, Canada

Application May 6, 1932. Serial No. 609,634

5 Claims. (Cl. 192—105)

This invention relates to an automatic friction clutch for automobile engines and the like.

An object of the invention is to provide a friction clutch which will be automatic of operation, the tractive effort of which will vary with the speed of the flywheel.

Another object of the invention is to design such a clutch to a very simple construction, the parts of which may all be readily accessible for purposes of inspection and repair.

Another object of the invention is to utilize the rotation of the flywheel to provide the necessary tractive effort, by means of pivoted weights which will swing outwardly upon the rotation of the flywheel.

Another object is to provide resilient means which will yieldingly resist the outwardly swinging movement of the weights, the tension in the resilient means being adjustable, so that the rotary speed of the flywheel necessary to bring the clutch into operation may be varied.

Other objects and advantages of a clutch made in accordance with my invention will appear as the specification is read in the light of the drawings.

In the drawings, wherein like numerals of reference indicate corresponding parts in the various figures.

Figure 1:
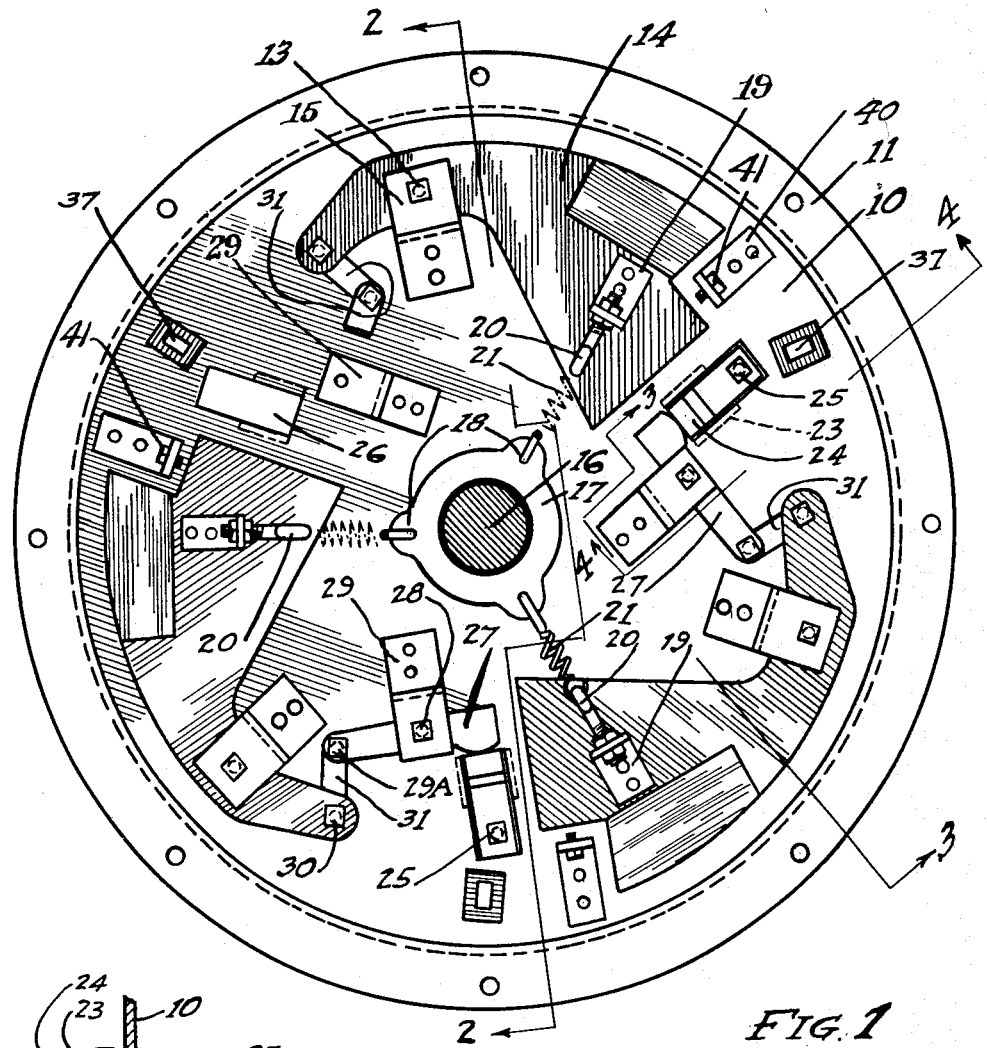
Figure 1 is an elevation of the clutch, with clutch housing not shown, looking towards the engine (not shown).
Figure 3:
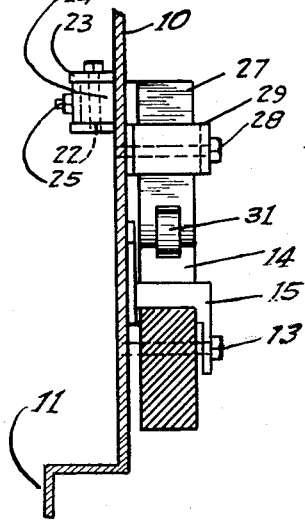
Figure 3 is a section on line 3—3 in Figure 1.
Figure 4:
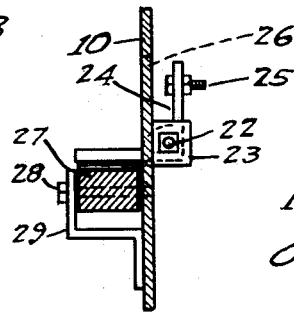
Figure 4 is a section on line 4—4 in Figure 1.
Figure 2:
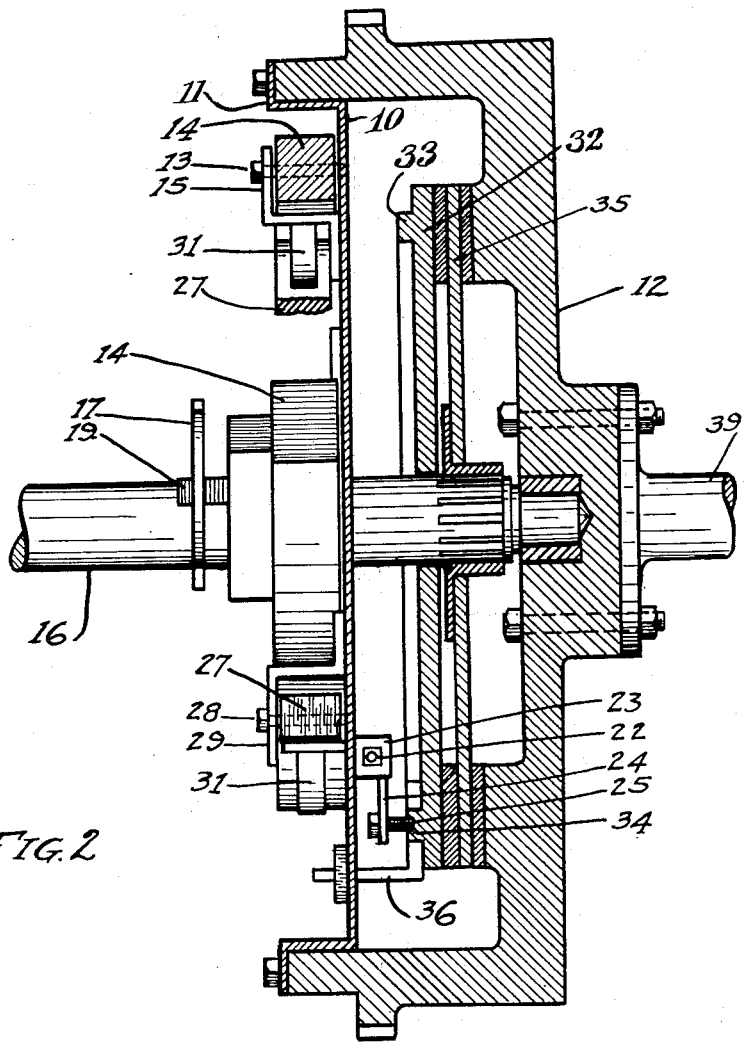
Figure 2 is a section on line 2—2 in Figure 1.

Referring now by numerals to the drawings, 10 is a disc formed with a flange 11 adapted to engage and be suitably secured to the flywheel 12 so as to turn therewith.

On the disc 10 are pivotally mounted, as at 13, a number of weights 14. The pins 13 mounting the weights may be mounted as shown, that is, threaded into the disc at one end and passing through suitably formed brackets 15 secured to the disc. The weights are so formed and so mounted on their respective pins 13, that their rearward portions will swing outwardly from the centre or axis of the disc by the action of the centrifugal force developed upon rotation of the disc with the flywheel.

On the driven shaft 16 is loosely mounted a ring 17 which may be formed with spaced eyes or lugs 18. On the weights, at their rearward portions, may be secured brackets 19 adapted to adjustably receive eyebolts 20. Between the eyebolts 20 and the lugs 18 are anchored coil springs 21. Thus, the spring will yieldingly resist any outwardly swinging movement of the weights; similarly, the rotary speed of the disc 10 required to swing the weights may be made more or less by increasing or decreasing, respectively, the tension in the springs by the manipulation of the eyebolts 20.

By loosely mounting the ring 17 on the transmission shaft, as aforesaid, that is, by allowing a slight clearance between the ring and the shaft, the tension in all of the springs 21 will tend to become equalized.

Pivotally mounted to the disc, as at 22, or more particularly to lugs 23 from the disc, are cranks 24 one portion or leg of which carries a screw 25; these cranks are mounted with their axes or pivotal connections in a plane parallel with the disc. The other end of the crank projects through an opening 26 in the disc. Co-operating, or adapted to engage with, the end of the crank which projects through the opening 25, is a lever 27. This lever 27 turns on a pin 28 mounted on the disc, or more particularly, threaded at one end in the disc and passing through a bracket 29 secured to the disc, the lever thus turning in a plane parallel with the disc.

Between the levers 27 and the forward portions of the weights 14, are pivotally secured, as at 29A and 30, rods or links 31. Thus, it will be seen that as the rearward portions of the weights swing outwardly, upon sufficient rotation of the disc to overcome the tension in the springs 21, the screws 25 on the cranks 24 will be moved away from the disc.

Co-operating with the screws 25 is a pressure plate 32, free to slide on the driven shaft, this pressure plate having a raised, circular portion 33 recessed as at 34 to receive the ends of the screws 25. Adjacently of the pressure plate, and slidably mounted on the transmission shaft, is the usual clutch disc 35 with which the pressure plate co-operates to turn the transmission shaft with the crank shaft 39.

In order to remove any torque or bending stresses from the screws 25 and from the cranks 24, brackets or fingers 36 are secured to the disc and extend through openings 37 in the disc, the pressure plate thus being turned by the fingers.

On the disc may be secured brackets 40, in which are threaded screws 41 adapted to be engaged by the weights 14 when these have swung sufficiently upon the rotation of the flywheel. Such screws will operate as stopping means determining the swung or operative position of the weights and thus relieve the cranks 24 of any stresses in excess of those required to sufficiently press the pressure plate against the clutch disc. By turning the screws 41 in their brackets, the angular displacement of the weights may be accordingly adjusted or varied.

*Operation*

The disc 10 turns continuously with the flywheel 12. Under a certain engine speed, the weights 14 are retained in their inoperative positions under the action of the springs 21, that is, the centrifugal force upon the weights is not sufficient to overcome the tension in the springs so that the screws 25 on the cranks 24 do not press and shift the pressure plate 32 into operative engagement with the clutch disc 35. Upon sufficient speed of the flywheel, the screws 25 press and shift the pressure plate, and the pressure with which the pressure plate engages the clutch disc varies with the speed of the flywheel. As the weights swing outwardly on their pivotal connections 13, the links 31 are moved towards the transmission shaft or axis of the disc 10, turning the levers 27 which in turn actuate or swing the cranks 24.

For purposes of clearness the clutch housing which will enclose the device complete has not been shown.

What I claim is:—

1. In an automatic friction clutch for automobile engines and the like, a disc turning with the flywheel, weights pivotally mounted on said disc adapted to swing upon the rotation of said disc, a driven shaft, a pressure plate slidably mounted on said driven shaft and turning with said disc a clutch member turning with said driven shaft, cranks pivotally mounted on said disc operable to slide said pressure plate into operative engagement with said clutch member, means yieldingly resisting the swinging movement of said weights upon the rotation of said disc, levers pivotally mounted on said disc co-operating with said cranks in operating the same to slide said pressure plate, and links pivotally connected to said levers and weights whereby said cranks are operated to slide said pressure plate by the swinging movement of said weights against the action of said means.

2. In an automatic friction clutch for automobile engines and the like, a disc turning with the flywheel, weights pivotally mounted on said disc adapted to swing upon the rotation of said disc, a driven shaft, a pressure plate slidably mounted on said driven shaft and turning with said disc a clutch member turning with said driven shaft, cranks pivotally mounted on axes parallel with the plane of said disc and operable to slide said pressure plate into operative engagement with said clutch member, means yieldingly resisting the swinging movement of said weights upon the rotation of said disc, levers pivotally mounted on axes at right angles to the plane of said disc co-operating with said cranks in operating the same to slide said pressure plate, and links pivotally connected to said levers and weights whereby said cranks are operated to slide said pressure plate by the swinging movement of said weights against the action of said means.

3. In combination with a flywheel and a pressure plate turning therewith and axially slidable relative thereto, a clutch member between said flywheel and said pressure plate, movable weights carried by said flywheel, means yieldingly resisting the movement of said weights upon the rotation of said flywheel, cranks pivotally carried by said flywheel operable to slide said pressure plate into operative engagement with said clutch member, levers pivotally carried by said flywheel co-operating with said cranks in operating the same to slide said pressure plate, and links pivotally connected between said levers and said weights whereby said cranks are operated to slide said pressure plate by the movement of said weights against the action of said means.

4. In combination with a flywheel and a pressure plate turning therewith and axially slidable relative thereto, a clutch member between said flywheel and said pressure plate, movable weights carried by said flywheel, means yieldingly resisting the movement of said weights upon the rotation of said flywheel, cranks pivotally carried by said flywheel on axes parallel with the plane thereof, levers pivotally carried by said flywheel on axes at right angles to the plane thereof, and links pivotally connected between said levers and said weights whereby said cranks are operated to slide said pressure plate by the movement of said weights against the action of said means.

5. In combination with a flywheel and a pressure plate turning therewith and axially slidable relative thereto, a clutch member between said flywheel and said pressure plate, weights pivotally carried by said flywheel, means yieldingly resisting the swinging movement of said weights upon the rotation of said flywheel, cranks pivotally carried by said flywheel adapted to move said pressure plate into operative engagement with said clutch member, levers pivotally carried by said flywheel co-operating with said cranks in operating the same to move said pressure plate, and links pivotally connected between said weights and said levers whereby said cranks are operated to slide said pressure plate by the swinging movement of said weights against the action of said means.

OVILA LALONDE.